Figure 1:
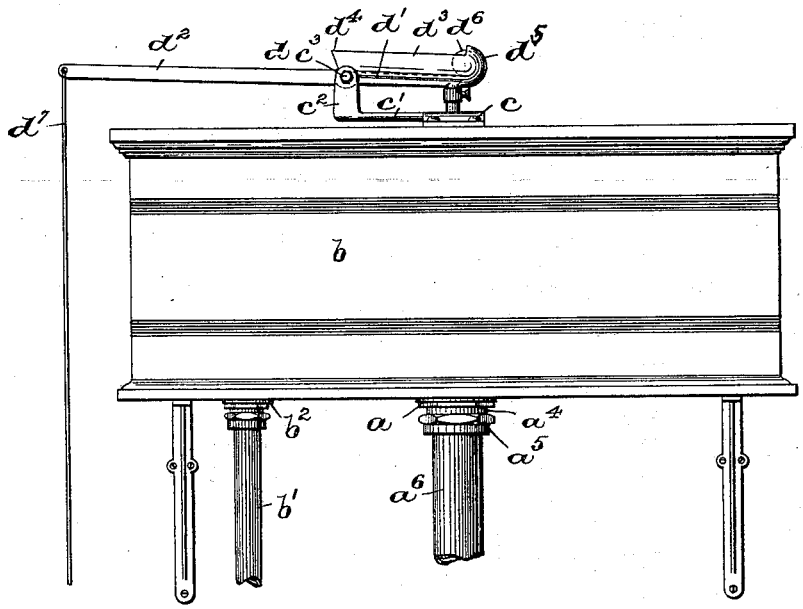

(No Model.)  2 Sheets—Sheet 1.

E. M. STIRLING.
FLUSHING TANK.

No. 604,178. Patented May 17, 1898.

WITNESSES:
Marcy J. Trusdell
Wm. H. Campfield Jr

INVENTOR:
EDWARD M. STIRLING.
BY Fred'k C. Fraentzel,
ATTORNEY (No Model.) 2 Sheets—Sheet 2.

E. M. STIRLING.
FLUSHING TANK.

No. 604,178. Patented May 17, 1898.

WITNESSES:

Mary B. Trusdell
Wm. H. Camfield Jr.

INVENTOR:
EDWARD M. STIRLING,
BY
Fred C. Fraentzel,
ATTORNEY

UNITED STATES PATENT OFFICE.

EDWARD M. STIRLING, OF NEWARK, NEW JERSEY.

FLUSHING-TANK.

SPECIFICATION forming part of Letters Patent No. 604,178, dated May 17, 1898.

Application filed February 17, 1897. Serial No. 623,834. (No model.)

*To all whom it may concern:*

Be it known that I, EDWARD M. STIRLING, a citizen of the United States, residing at Newark, in the county of Essex and State of New Jersey, have invented certain new and useful Improvements in Flushing-Tanks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to improvements in flushing-tanks, cisterns, or the like to be used in connection with water-closets, urinals, &c.; and the invention has for its main object to provide a device of the character stated the parts of which are simple in construction, one principal feature being to provide an outlet-valve the closing of which upon its seat is consequent to the ingress of water directly into a hollow vessel forming a float and constituting the valve, whereby the closing of the valve after it has been raised from its seat in the tank is automatic, slowly permitting the necessary quantity of water to escape in order to properly flush the water-closet, urinal, or other parts connected with the tank in which said valve operates.

A further object of this invention is to provide a valve for the purposes stated consisting of a hollow vessel of any desired shape, which when raised from its seat will become filled with water to force the air previously contained in said vessel therefrom through an air-duct, and a regulating means connected therewith, and as said vessel descends and finally rests upon a seat connected with the outflow-pipe of the tank or cistern the water in said hollow vessel will escape therefrom into said outflow-pipe, while the air again passes through the duct to fill said vessel, said vessel being held in its closed position on the seat by means of suitable mechanism, which when operated again permits the ascending of said vessel from its seat.

A further object of this invention is to provide in connection with said hollow vessel or float acting as a valve a second or supplementary float which when the water in the tank reaches a certain height and should the ordinary closing device for shutting off the supply of the water fail to work will rise with the water and together with the hollow vessel hereinabove mentioned cause the valve to be opened and permit the water in the tank to escape into the outlet-pipe connected with the water-closet or other parts to be flushed.

My invention therefore consists, broadly, in the novel construction of hollow vessel, which acts as a float and valve for a flush-tank, cistern, or the like adapted to alternately receive air and water, the ingress of the latter into said vessel causing the closure of the opening in the outflow-pipe connected with the tank or cistern.

The invention consists, furthermore, in certain other novel arrangements and combinations of parts and the details of construction thereof, such as will be hereinafter fully described, and finally embodied in the clauses of the claim.

The invention is clearly illustrated in the accompanying sheets of drawings, in which—

Figure 2:
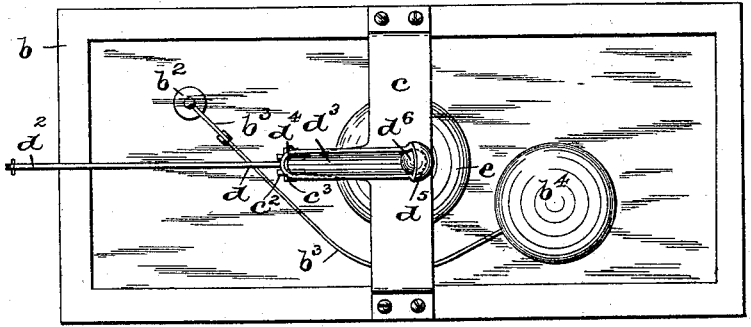
Figure 3:
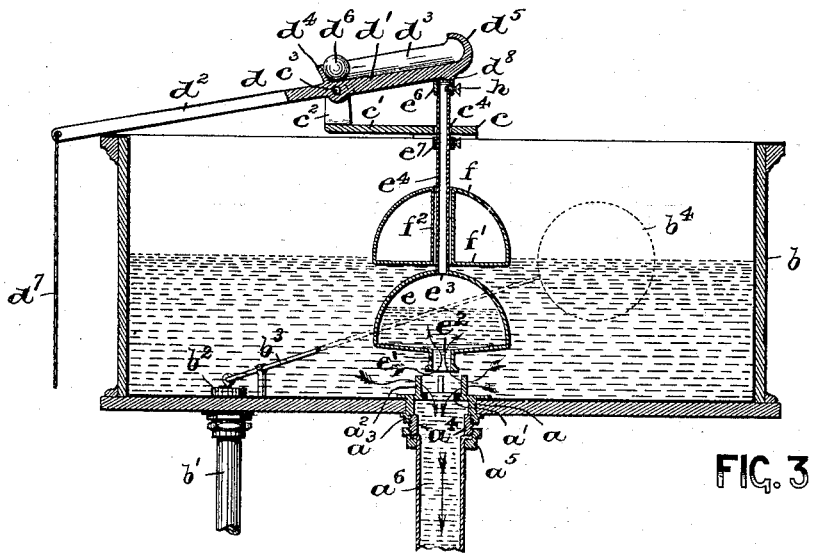
Figure 4:
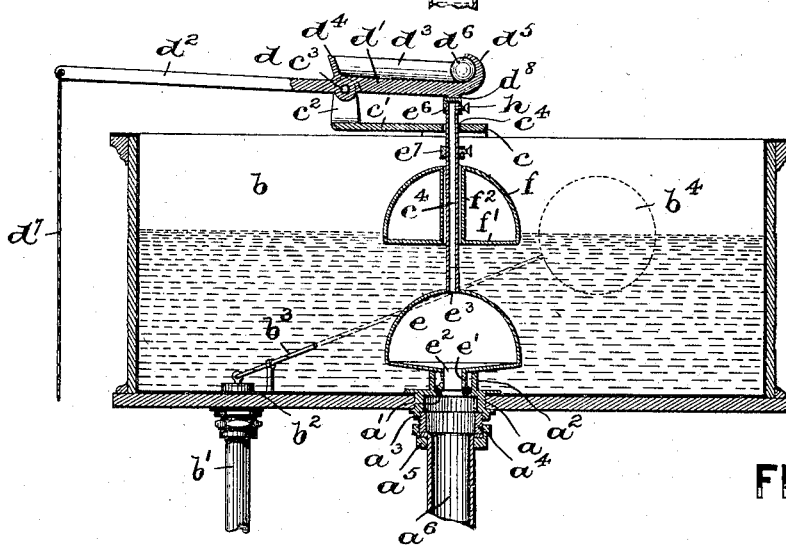
Figure 5:
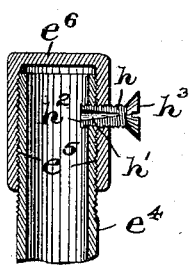
Figure 6:
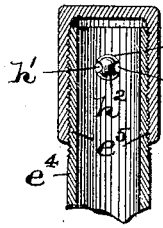

Figure 1 is a front elevation of a flushing-tank provided with my improvements, and Fig. 2 is a top view of the same. Fig. 3 is a longitudinal vertical section of the tank and controlling mechanism therein, the latter being represented in its raised position to permit the flow of the water in said tank into the outlet-pipe connected therewith. Fig. 4 is a similar view of the said parts, showing the mechanism in its unoperated position closing the mouth of the outlet-pipe of the tank. Fig. 5 is a detail section of the upper part of the air-duct connected with the hollow vessel or float of the tank, illustrating one form of regulating-valve connected therewith; and Fig. 6 is a sectional view of the parts illustrated in Fig. 5, said section being taken in a plane at right angles to the plane of section in Fig. 5.

Similar letters of reference are employed in all of the above-described views to indicate corresponding parts.

Referring to the accompanying drawings, $b$ represents the ordinary form of flush-tank or cistern, provided with a suitable supply-pipe $b'$ for admitting water into the same, and $b^2$ is the usual form of shut-off valve, operated by a pivotally-arranged lever $b^3$ and float $b^4$, all of which are of the usual construction. In the bottom of said tank is an outlet or opening in which I have secured a suitably-constructed valve-seat $a$, provided with a rubber or other like gasket or packing-ring $a'$, and $a^2$ are a suitable number of uprights which act as guides to properly conduct the bottom of a hollow vessel or float $e$ down upon the said gasket to close said opening in the manner and for the purposes to be hereinafter fully explained. Said valve-seat is preferably provided in the bottom with a screw-threaded portion $a^3$, into which may be screwed a threaded collar $a^4$, adapted to receive a union $a^5$, for securely attaching and connecting an outflow-pipe $a^6$ thereto. As will be seen from the several figures of the drawings, I have secured to the top of said tank or cistern $b$ a suitable cross-bar or bridge $c$, having a rearwardly-extending arm $c'$, which is provided with a pair of upwardly-extending and perforated ears or lugs $c^2$, in which is arranged a suitable pivot or pin $c^3$. On said pin is a lever or rod $d$, comprising two arm portions $d'$ and $d^2$, said arm $d'$ being made trough shaped, as at $d^3$, and having the end stops $d^4$ and $d^5$, whereby a suitable ball $d^6$ is adapted to roll back and forth in said trough, when the arm portion $d^2$ of said rod or lever $d$ is pulled down by means of a flexible connection $d^7$, such as a chain or rope, which is attached to the end of said arm portion $d^2$ in any well-known manner.

Adapted to rest upon the gasket in the valve-seat $a$ and extending between the uprights or guides $a^2$ thereof when there is no water in the tank or cistern $b$ is the neck-shaped mouth $e'$ of a suitable hollow vessel $e$, made of sheet metal or any other light material that may answer the purposes of this invention, said neck $e'$ being provided with an opening $e^2$, substantially as illustrated. In the top of said vessel $e$, which forms a float, is a second opening $e^3$, communicating with the interior of a tube or stem $e^4$, suitably secured to the top of said vessel $e$. Said tube or stem $e^4$ extends up and passes through a bearing or hole $c^4$ in the bar $c$, and has secured thereto, preferably by means of a screw-threaded portion $e^5$, a cap $e^6$ to close said end of the tube, said cap being in frictional contact with a suitable boss $d^8$, formed on the under surface of the arm portion $d'$ of the rod or lever $d$, as clearly represented in Figs. 3 and 4. Upon the said tube $e^4$ and beneath said cross-bar $c$ is an adjustable collar $e^7$, and loosely arranged on said tube $e^4$, between the top of said vessel $e$ and said collar $e^7$, is a second float $f$. Said float $f$, which may be of any desirable shape, is hollow, being preferably provided with a bottom $f'$ and a tube-like portion $f^2$, whereby said float $f$ can slide upon said tube $e^4$, its upward movement being limited by the adjustable collar $e^7$, while its downward movement is limited by the top of the vessel $e$, or it generally floats directly upon the surface of the water, as will be clearly understood from an inspection of the drawings. At or near the top of said tube $e^4$ is a regulating-valve $h$, which consists, essentially, of an ordinary screw provided with one or more air-passages, as $h'$, said passages being larger at the end $h^2$ of the screw than near the head $h^3$ thereof, whereby when said screw is screwed in or out in suitable holes in the parts with which it is connected air-passages of an increased or diminished cross-section can be provided in the duct $e^4$, and the flow of air into or from the duct $e^4$ can therefore be regulated to control or regulate the ingress of the water into the vessel $e$, when the latter has been raised from its seat $a$, by operating the lever or rod $d$, when a pull is exerted upon the flexible connection $d^7$, attached thereto.

The operation of the device is very simple, and it is as follows: When there is no water in the tank or cistern $b$, then the valve $b^2$ in the pipe $b'$ is open and the water enters through said pipe into the tank until it reaches a predetermined height, when the float $b^4$, connected with the lever $b^3$, causes the closing of said valve in the usual manner, and the ingress of the water into the tank or cistern is stopped. At the same time the arm or lever $d$ is in the position indicated in Fig. 4, the portion $d'$ and the ball $d^6$ in its trough bearing heavily down upon the top of the tube $e^4$, connected with the float or vessel $e$, whereby the outlet in the bottom of the tank connecting with the outflow-pipe $a^6$ is positively closed, while the float $f$ rests lightly upon the surface of the water. When it is desired to use the water in the tank or cistern $b$ for flushing purposes, a pull on the connection $d^7$, attached to the rod or lever $d$, causes the latter to assume the position indicated in Fig. 3, and the ball $d^6$ rolls from its position in Fig. 4 in said trough $d^3$ to the position indicated in said Fig. 3. Immediately the vessel or float $e$ begins to rise, being guided by the tube $e^4$, moving in the bearing or hole $c^4$ in the cross-bar $c$, and the water will pass through the mouth in the bottom of said vessel $e$ into the interior thereof, a sufficient quantity of water at the same time passing down into the outflow-pipe $a^6$, as indicated by the arrows in Fig. 3, for the purpose of flushing the water-closet, urinal, &c. The water, while it forces the air in said vessel $e$ through the tube $e^4$, connected therewith, and out of the regulating-valve $h$, very quickly fills said vessel $e$ and causes it to sink to the bottom and again close the opening in the bottom of the tank to stop the egress of water from the tank into said pipe $a^6$, as will be clearly evident. During this operation the operator has released the connection $d^7$ and the heavier arm portion $d'$ and the ball $d^6$ in the trough $d^3$ return to their former positions, (indicated in Fig. 4,) whereby said vessel or float $e$ totally closes the outlet in the bottom of the tank $b$ and holds the parts of the mechanism in these positions until again released by a pull on the connection $d^7$. The valve $b^2$ is still open and the water from the pipe $b'$ again enters the tank until said valve $b^2$ becomes closed by the float $b^4$ and its connecting-lever $b^3$ in the usual and well-known manner.

Should the valve $b^2$ and its connecting mechanism for controlling the same for some one reason or another become inoperative and fail to shut off at the proper time the fresh supply of water into the tank or cistern $b$ to prevent any possible overflow and consequent damage by water, the float $f$, movably arranged on the tube $e^4$, will rise with the level of the water until it is brought into operative contact with the collar $e^7$, when the combined effort of the two hollow floats $e$ and $f$, owing to the increased volume of air in both floats combined, will automatically tilt the rod or lever $d$, causing it to assume the position indicated in Fig. 3. In consequence thereof the vessel or float $e$ will begin to rise in the manner hereinabove described and the opening in the bottom of the tank will permit the escape of the water down into and through the pipe $a^6$, and the action of the two floats will be up and down, alternately opening and closing the valve-seat until the valve $b^2$ either finds its seat properly to shut off the fresh supply of water into the tank $b$ or until these parts of the mechanism have been repaired.

From the above description it will be seen that a practical and operatively-constructed device for the purposes stated has been devised, the many advantages being evident and need therefore not be further set forth here.

The size and proportions, as well as the shapes of the parts of the contrivance shown and the general arrangement and combinations thereof, may be varied without departing from the scope of my invention. Hence I do not limit my invention to the exact arrangements and combinations of the parts nor to the details of construction thereof.

Having thus described my invention, what I claim is—

1. In a flushing-tank or the like, an outlet-valve, comprising therein, a hollow vessel forming a float and adapted to rest upon a valve-seat, said float being open to the ingress of the water in the tank when off said valve-seat, and open to a supply of air when upon said valve-seat, and means, for preventing the displacement of said float from the valve-seat when filled with air, consisting, essentially, of a lever pivotally arranged above said flushing-tank, having arm portions $d'$ and $d^2$, a trough $d^3$ on said arm portion $d'$ and a ball movably arranged in said trough for normally exerting a pressure upon the top of said float, and means connected with the arm portion $d^2$ of said lever for operating the same and removing said ball from its holding or pressing contact upon said float, substantially as and for the purposes set forth.

2. In a flushing-tank or the like, an outlet-valve, comprising therein, a hollow vessel forming a float and adapted to fit on a valve-seat, said float being open to the ingress of the water in the tank when off said valve-seat, and a tube connected with the top of said float for admitting a supply of air into said float when upon said valve-seat, and means for preventing the displacement of said hollow float from the valve-seat when filled with air, consisting, essentially, of a lever pivotally arranged above said flushing-tank, having arm portions $d'$ and $d^2$, a trough $d^3$ in said arm portion $d'$ and a ball movably arranged in said trough for normally exerting a pressure upon the top of the air-tube on said float, and means connected with said arm portion $d^2$ of said lever for operating the same and removing said ball from its holding or pressing contact upon said air-tube, substantially as and for the purposes set forth.

3. In a flushing-tank or the like, an outlet-valve, comprising therein, a hollow vessel forming a float and adapted to fit on a valve-seat, said float being open to the ingress of the water in the tank when off said valve-seat, a tube connected with said float for admitting a supply of air into said float when upon said valve-seat, a regulating-valve in said tube, and means for preventing the displacement of said hollow float from the valve-seat when filled with air, consisting, essentially, of a lever pivotally arranged above said flushing-tank, having arm portions $d'$ and $d^2$, a trough $d^3$ in said arm portion $d'$ and a ball movably arranged in said trough for normally exerting a pressure upon the top of said air-tube on said float, and means connected with said arm portion $d^2$ of said lever for operating the same and removing said ball from its holding or pressing contact upon said air-tube, substantially as and for the purposes set forth.

4. In a flushing-tank or the like, an outlet-valve, comprising therein, a hollow vessel forming a float and adapted to fit on a valve-seat, said float being open to the ingress of the water in the tank when off said valve-seat, and open to the supply of air when upon the valve-seat, a stem on said float and an adjustable stop on said stem, a supplemental float to prevent overflow of the water in the flushing-tank, said supplemental float being adapted to engage with said stop on said stem, and coöperating with the hollow vessel forming the other float, to raise it off its valve-seat, and means for normally preventing the displacement of said hollow vessel from its valve-seat, consisting, essentially, of a lever pivotally arranged above said float on said valve-seat, and a weight movable only on that portion of the lever between its pivotal support and its free end directly above said float, for normally exerting a pressure on the float and causing it to rest upon the valve-seat, substantially as and for the purposes set forth.

5. In a flushing-tank or the like, an outlet-valve, comprising therein, a hollow vessel forming a float and adapted to fit on a valve-seat, said float being open to the ingress of the water in the tank when off said valve-seat, and open to the supply of air when upon the valve-seat, a supplemental float to prevent overflow of the water in the flushing-tank, said supplemental float coöperating with the hollow vessel forming the other float, to raise it off its valve-seat, and means, for normally preventing the displacement of said hollow vessel from its valve-seat, consisting, essentially, of a lever pivotally arranged above said flushing-tank, having arm portions $d'$ and $d^2$, a trough $d^3$ on said arm portion $d'$ and a ball movably arranged in said trough for normally exerting a pressure upon the top of said float, and means connected with the arm portion $d^2$ of said lever for operating the same and removing said ball from its holding or pressing contact upon said float, substantially as and for the purposes set forth.

6. In a flushing-tank or the like, an outlet-valve, comprising therein, a hollow vessel $e$ forming a float and adapted to fit on a valve-seat, said float being open to the ingress of the water in the tank when off said valve-seat, a tube $e^4$ connected with said float $e$ for admitting a supply of air into said float when upon said valve-seat, a stop on said tube, a supplemental float $f$ movably arranged on said tube $e^4$ to prevent overflow of the water in the flushing-tank, said supplemental float being adapted to engage with said stop, and coöperating with the hollow vessel or float $e$ to raise it off its valve-seat, and means, for normally preventing the displacement of said float $e$ from its valve-seat, consisting, essentially, of a lever pivotally arranged above said float on said valve-seat, and a weight movable only on that portion of the lever between its pivotal support and its free end directly above said float, for normally exerting a pressure on the float and causing it to rest upon the valve-seat, substantially as and for the purposes set forth.

In testimony that I claim the invention set forth above I have hereunto set my hand this 13th day of February, 1897.

EDWARD M. STIRLING.

Witnesses:
FREDK. C. FRAENTZEL,
WM. H. CAMFIELD, Jr.